Feb. 19, 1935.  L. C. BROECKER  1,991,974
SPRINGLESS TIRE VALVE INSIDE CONSTRUCTION
Filed May 28, 1932
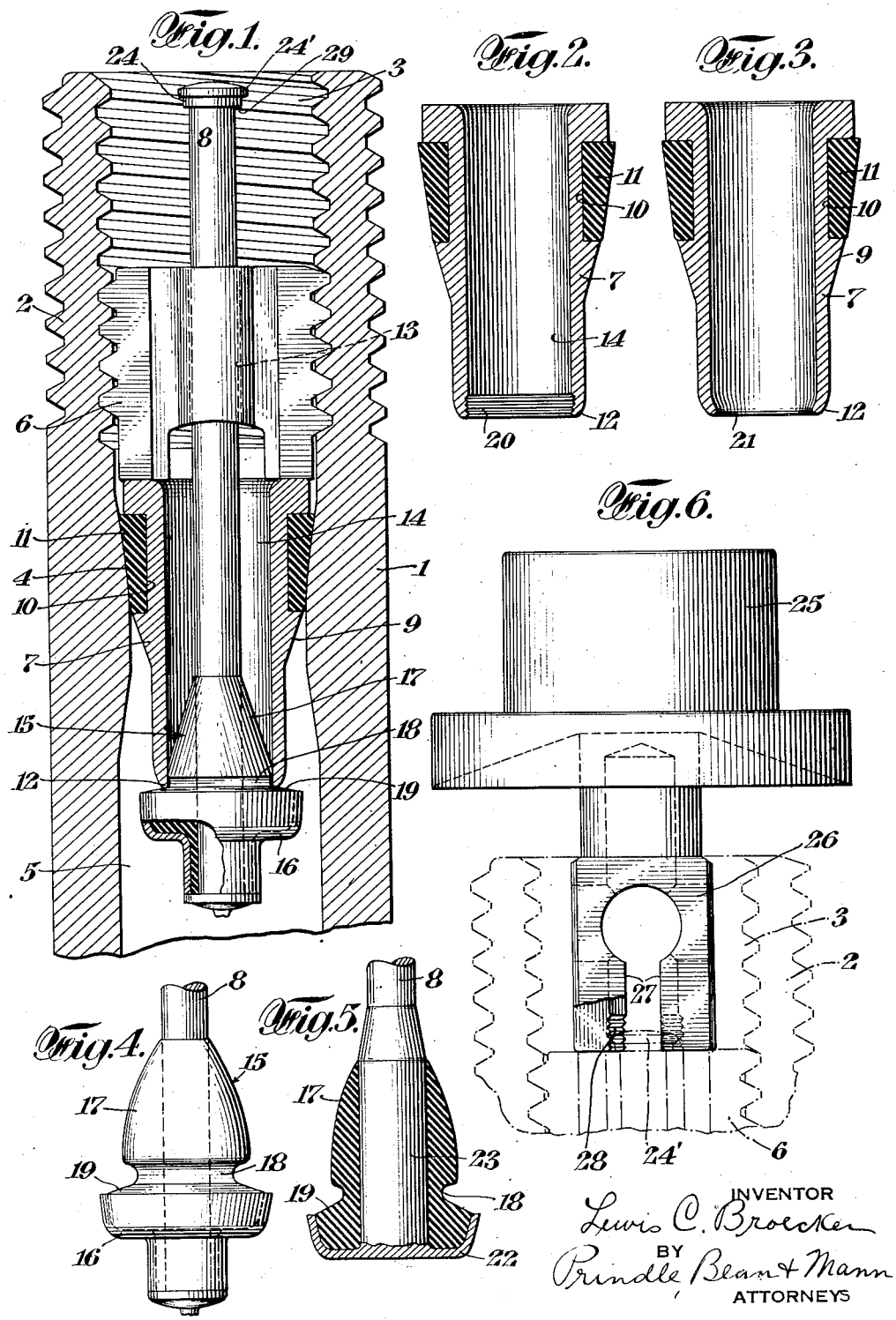
INVENTOR
Lewis C. Broecker
BY Prindle Bean & Mann
ATTORNEYS Patented Feb. 19, 1935

1,991,974

UNITED STATES PATENT OFFICE 1,991,974

SPRINGLESS TIRE VALVE INSIDE CONSTRUCTION

Lewis C. Broecker, Bridgeport, Conn., assignor to Bridgeport Brass Company, Bridgeport, Conn., a corporation of Connecticut Application May 28, 1932, Serial No. 614,116

11 Claims. (Cl. 284—19)

This invention relates to improvements in tire valves and more particularly to the construction of the insides therefor, and the principal object is the provision of a tire valve inside construction which eliminates the use of a spring or springs as commonly used in standard practice at the present time.

The reasons for using springs include the following:—When a tire is inflated at the common or standard pressure, this pressure tends to close the valve and the flat rubber valve seat is pressed against the end of the barrel with sufficient force to make an air tight seal without the use of any spring. However, it has been found in practice, that, at high speeds, centrifugal force and the inertia of the movable parts of the inside construction may break the seal, when the tire travels over rough roads or is subject to severe jolting, thus permitting the air to escape; this is one reason for the utilization of the spring.

Furthermore, it is common practice for tire manufacturers to insert an inner tube into a tire casing and inflate the tube with air at just sufficient pressure to retain the tube in the casing. Thus inflated, the tires are shipped to the automobile manufacturers where they are assembled on the rims. This requires that the valve must be air tight under low pressure in order to retain the air in the tube for severel weeks or more while the tires are in storage and in transit. This air pressure itself is insufficient to keep the valve closed, especially when the tires are being handled and jarred in transit and therefore the spring is used to retain the valve in closed position when the air is at low pressure.

The use of springs adds to the cost of manufacture in assembling tire valve insides and also adds to the obstruction in the valve stem to the quick passage of air therethrough. This invention in eliminating the spring and the necessary accessories thereto provides a very simple structure composed of few parts and which is effective in operation and use to accomplish the necessary and desired results.

This invention relates to the same general subject matter described and claimed in my pending application for pneumatic valve inside construction filed July 1, 1931, Serial No. 548,063.

In the drawing—

Figure 1 represents a vertical longitudinal cross section of a valve stem having assembled therein a tire valve insides construction embodying my invention.

Figures 2 and 3 are detailed cross sectional views of slightly modified forms of barrel constructions.

Figure 4 is a side elevation of a modified form of construction of the lower end of the center pin and the valve washer or gasket.

Figure 5 is a cross sectional view of the lower end of the center pin and the valve washer or gasket showing a modified construction.

Figure 6 is a diagrammatic view illustrating the air chuck which may be used in connection with inflation of articles utilizing my invention.

Referring now to the drawing, the numeral 1 designates a valve stem for an inflatable article which has a rubber tube such as a pneumatic tire or the like. This stem may be of standard or any suitable construction, having an external thread 2 to receive a cap, not shown, an internal thread 3 to receive the valve inside, and a bevelled seat 4 formed at an intermediate part of the bore 5 to provide a seat for the barrel of the inside construction.

This inside construction includes an exteriorly threaded plug 6 adapted to fit within the upper portion of the stem and engage the internal threads 3 thereof, the barrel 7 and the center pin 8.

The barrel 7 is in the form of a tubular member, its upper and outer portion being bevelled as at 9 and grooved as at 10 to receive the bevelled or inclined washer 11 which is adapted to engage and fit tightly against the bevelled seat 4 provided in the interior of the valve stem 1 when the barrel is forced into position by the screw plug 6 being screwed home. The lower end of the barrel 7 is provided with an annular seating edge 12 which is adapted to receive the valve proper provided on the lower portion of center pin 8.

This center pin 8 passes through a bore 13 in the screw plug 6 and through the bore 14 of the barrel 7 and has its lower portion formed to receive the valve washer 15, this valve washer being adapted to be closed against the seat provided by the annular edge 12 of the barrel member 7 and prevent leakage of air from the inflated article.

The preferred manner of forming and mounting this rubber valve member 15 is illustrated in Figure 1 of the drawing where the open cup member 16 is formed or provided on the lower part of the center pin 8 and a conical rubber member 17 molded into said cup and about the lower portion of the center pin. This conical rubber member may be formed as a straight cone, see Figure 1 or as a rounded cone, see Figure 4, and is preferably provided with an annular groove 18 in the body thereof just above the upper edge of the cup 16. This rubber washer member is, of course, formed with the flat surface portion 19 to provide an extended seat for the seating edge 12 of the barrel. It is furthermore to be noted that the conical rubber member may be made slightly larger in diameter than the bore of the barrel and as it is of comparatively soft material, there will be considerable frictional contact between these parts as described more fully hereafter.

The purpose of the annular groove 18 is to receive the lower end of the barrel and to hold the seating edge 12 on the seat. In order to assist in this function it may be desirable to provide the inside of the lower portion of the barrel with a plurality of grooves or serrations 20, see Figure 2, or as an alternative to inturn the lower end of the barrel to form an annular rib or shoulder 21, see Figure 3.

In the form of center pin construction previously described and illustrated in Figures 1 and 4, the cup member 16 is provided near the end of the center pin either as a separate piece or formed as part of the center pin. It may also be desirable to provide such a construction as an integral part of the center pin and on the extreme lower end of the same. This is illustrated in Figure 5 where it is to be noted that cup 22 is formed on the extreme lower end of the center pin and the lower portion 23 of the body of the center pin is substantially thicker and stronger than the other part thereof. The other structural features are substantially the same as previously described.

In order to maintain a tight seal between the rubber valve washer member 17 and the seating edge 12 of the barrel, it is necessary to push the conical rubber washer member into the bore of the barrel mechanically. This may be effectively accomplished by providing the center pin 8 with a specially shaped upper head or end 24. It is enlarged to provide an extended annular flange 24' as shown. The conventional air chuck 25 may be used for inflation, but it is necessary to have a specially designed depresser pin 26. This depresser pin 26 has the lower portion of its bore 27 grooved or serrated on the inside thereof as at 28 so as to grip or engage the extending flange 24' of the head or end 24 of the center pin. The outer extreme diameter of the depresser pin is slightly less than the inside thread diameter of the valve stem 1.

In operation these parts work as follows. The depresser pin 26 engages the outer side of head 24 of center pin 8 and moves the latter downwardly until the shoulder 29 of said head 24 engages the top face of screw plug 6 so that the depresser pin snaps over the extending flange 24' of the center pin which engages with the grooves or serrations 28. When the preliminary inflation is completed, the chuck is withdrawn, the depresser pin withdrawing the center pin until the cone shaped washer member 17 is pulled firmly within the lower portion of the barrel and the rubber seat 19 into firm engagement with the seating edge 12 of the barrel so as to form an air tight joint. When this is accomplished the depresser pin automatically releases its engagement with the head of the center pin and friction of the conical rubber washer against the inner surface of the barrel retains the valve in closed air tight condition regardless of rough handling.

It is seen, by comparing this construction with the standard construction of tire valve insides at present in use, that the number of parts has been materially reduced, the size of the parts within the valve stem has been substantially reduced so as to permit quicker inflation and high inflation speed, and the necessity of the use of any springs or resilient members has been obviated. Furthermore, the engagement of the relatively movable parts with each other in closed position is always secure and air tight and eliminates any chance of accidental or unintentional leakage. The particular form of fit between the barrel 7 and the rubber washer valve member 17 is very effective as these two parts have an extended frictional engagement with each other, the rubber member being under pressure to increase such engagement and therefore the tightness of the joint. The elimination of the foot of the center pin and the spring remove considerable obstruction from the internal bore of the valve stem. The cost of manufacture is reduced by the saving in the cost of making the additional parts and also in assembling the article.

What I claim is:

1. A center pin for pneumatic valves and the like having a rubber valve washer or gasket, said valve washer or gasket being of conical shape and having a groove wholly in the rubber near the base end of the cone.

2. In combination in a tire valve inside construction, a tubular member or barrel having an inwardly extending flange with a seating edge, a center pin passing through said tubular member or barrel and having a valve washer or gasket secured thereto, said valve washer or gasket being of conical shape and being larger in diameter at the base than the aforesaid valve engaging portion of said barrel.

3. In combination in a tire valve inside construction, a tubular member or barrel having an inwardly extending flange with a seating edge, a center pin passing through said tubular member or barrel and having a valve washer or gasket secured thereto, said valve washer or gasket being of conical shape and being larger in diameter at the base than the aforesaid valve engaging portion of said barrel, and having a groove formed near the lower edge of the conical shaped washer to receive said valve engaging portion.

4. In combination in a tire valve inside construction, a tubular member or barrel, having an inwardly directed flange with a seating edge, a center pin passing through said tubular member or barrel and having a valve washer or gasket secured thereto, said valve washer or gasket being formed of resilient material and having an annular groove formed therein adapted to receive the flange and having a flat portion to receive the seating edge of said barrel.

5. In combination, a valve construction including a valve stem, valve insides including a barrel mounted therewithin and including a center pin having a valve washer or gasket provided near one end thereof and adapted to be drawn into and to releasably grip the barrel, said center pin having a head; and an air chuck for introducing air through said valve, said chuck having means adapted to engage said head of the center pin so as to pull said center pin outwardly by the withdrawal of the air chuck to cause frictional engagement between the valve washer or gasket and the barrel.

6. For use with an air chuck, a valve construction including in combination a valve stem and a valve insides comprising a threaded plug, a barrel having a valve seating edge, a center pin extending through said plug and barrel and having a valve washer or gasket provided on one end, said valve washer or gasket being of compressible material and adapted to extend within said barrel and be engaged by the seating edge and the inside surface of said barrel, said center pin having a head providing means adapted to be engaged by an air chuck and to be pulled outwardly by the withdrawal of said chuck to cause the seating of the valve washer or gasket upon the seating edge of the barrel and within the barrel, said air chuck having spring fingers adapted to resiliently snap over and grip the head of the center pin.

7. In combination in a tire valve insides construction, a tubular member or barrel having a seating edge, a center pin passing through said tubular member or barrel, and having a rubber valve secured thereto, said rubber valve having a base portion with an annular flat surface which seats against the seating edge of the barrel and having an upper portion which is received up into the barrel, said upper portion being formed with a rib which is adapted to enter the barrel and to be squeezed against the inside thereof when the valve is seated as aforesaid.

8. In combination in a tire valve insides construction, a tubular member or barrel having a seating edge, a center pin passing through said tubular member or barrel, and having a rubber valve secured thereto, said rubber valve having a base portion with an annular flat surface which seats against the seating edge of the barrel and having an upper portion which is received up into the barrel, said upper portion being formed with a substantially annular rib which is located adjacent to and is space-separated from the aforesaid annular flat surface and which is adapted to enter the barrel and to be squeezed against the inside thereof when the valve is seated as aforesaid.

9. A center pin for pneumatic valves and the like having a rubber valve, washer or gasket, which comprises, a conical upper portion separated by a circumferential groove at its base from a lower portion larger in diameter than the base of the conical upper portion and forming an annular upwardly facing seating surface.

10. In combination, in a tire valve insides construction, a tubular member or barrel having a seating edge, a center pin passing through said tubular member or barrel and carrying a rubber valve which comprises a conical upper portion separated by a circumferential groove at its base from a lower portion larger in diameter than the base of the conical upper portion and forming an annular upwardly facing seating surface, said conical portion of the valve at the basal corners thereof being larger in diameter than the bore of the tubular member or barrel so as to be compressed and gripped when pulled therein to seat the annular upwardly facing surface of the valve against the seating edge of said member or barrel.

11. In combination, an air-chuck; a valve-stem or casing; and a valve insides for said stem or casing including barrel, center pin and rubber valve on said pin, said valve by pulling upwardly on the pin being seatable against the lower edge of the barrel, said valve having a rubber upward extension larger in diameter than the bore of the barrel and receivable under compression therein, the upper end of the center pin having a head with an overhanging peripheral portion, said pin further having a stop-shoulder engaging the valve insides and spacing the head therefrom when the pin is forced inwardly by the air chuck to unseat the valve as a preliminary to pumping up the tire, said air chuck having spring fingers adapted to resiliently snap over and grip the overhanging peripheral portion of the head when the chuck is forcibly pressed against said head, said spring fingers on withdrawing the chuck serving to pull the pin upwardly until stopped by the aforesaid seating of the valve, whereupon said fingers release their grip on the head of the center pin.

LEWIS C. BROECKER.